(12) United States Patent
Salser, Jr.

(10) Patent No.: US 7,283,063 B2
(45) Date of Patent: Oct. 16, 2007

(54) ABOVE GROUND ANTENNA AND TRANSMITTER FOR UTILITY METERS

(75) Inventor: Floyd Stanley Salser, Jr., Ocala, FL (US)

(73) Assignee: MARS Company, Ocala, FL (US)

( * ) Notice: Subject to any disclaimer, the term of this patent is extended or adjusted under 35 U.S.C. 154(b) by 272 days.

(21) Appl. No.: 11/176,919

(22) Filed: Jul. 7, 2005

(65) Prior Publication Data

US 2007/0018849 A1    Jan. 25, 2007

(51) Int. Cl.
G08C 15/06    (2006.01)

(52) U.S. Cl. ............... 340/870.02; 343/719; 343/872; 361/679

(58) Field of Classification Search ........... 340/870.02, 340/870.03; 343/719, 872; 361/679
See application file for complete search history.

(56) References Cited

U.S. PATENT DOCUMENTS

| | | | |
|---|---|---|---|
| 5,298,894 A | 3/1994 | Cerny et al. | |
| 5,335,251 A | 8/1994 | Onishi et al. | |
| 5,523,751 A | 6/1996 | Byford et al. | |
| 5,619,192 A | 4/1997 | Ayala | |
| 5,825,303 A * | 10/1998 | Bloss et al. | 340/870.02 |
| 5,877,703 A * | 3/1999 | Bloss et al. | 340/870.02 |
| 6,177,883 B1 | 1/2001 | Jennetti et al. | |
| 6,218,995 B1 | 4/2001 | Higgins et al. | |
| 6,262,685 B1 | 7/2001 | Welch et al. | |
| 6,300,907 B1 | 10/2001 | Lazar et al. | |
| 6,369,769 B1 * | 4/2002 | Nap et al. | 343/719 |
| 6,378,817 B1 * | 4/2002 | Bublitz et al. | 248/200 |
| 6,414,605 B1 * | 7/2002 | Walden et al. | 340/870.02 |
| 6,604,434 B1 | 8/2003 | Hamilton et al. | |
| 6,606,065 B1 | 8/2003 | Payne et al. | |
| 6,612,188 B2 | 9/2003 | Hamilton | |
| 6,637,911 B2 | 10/2003 | Sittner | |
| 6,755,148 B2 | 6/2004 | Holowick | |
| 6,819,292 B2 | 11/2004 | Winter | |

OTHER PUBLICATIONS

Robert Roy Britt, "Person Nuclear Power: New Battery Lasts 12 Years", LiveScience (May 13, 2005).
Anders Sandberg, "Dyson Sphere FAQ," www.nada.kth.se.

* cited by examiner

*Primary Examiner*—Albert K. Wong
(74) *Attorney, Agent, or Firm*—Monty Simmons; Simmons Patents

(57) ABSTRACT

Automatic Meter Reading (AMR) technology includes communication apparatus comprising a transmitter associated with an antenna wherein the transmitter is in communication with a utility meter installed in an underground enclosure. The communication apparatus includes a housing comprising a top-section and a depending base. The top-section at least partially houses the transmitter and the antenna with the depending base housing a power source operatively connected to the transmitter. The top-section is adjacent to an exterior side surface the underground enclosure. The depending base extends from the top-section, through an opening in said exterior side surface, and into the underground enclosure.

28 Claims, 13 Drawing Sheets

ABOVE GROUND ANTENNA AND TRANSMITTER FOR UTILITY METERS

TECHNICAL FIELD OF THE INVENTION

The present invention relates to an apparatus and method for housing a ground level antenna and transmitter for transmitting data to a remote location. The ground level transmitter is associated with a utility meter installed in an underground enclosure and may be powered by a power source located inside the underground enclosure.

BACKGROUND

Utility meters, including mechanical, electromechanical, and solid state meters, are well known and have been used for many years to measure the consumption of resources such as water, gas and electricity. Water meters, for example, generate data indicative of the consumption of water, where such data is used for billing purposes. Initially, utility meters were mechanical devices. As electronic technology advanced, such technology became smaller and less expensive, and thus, more suitable for use in the highly competitive and cost sensitive utility meter market. As such, the use of electromechanical (hybrid meters) and electronic meters has become more common. Indeed, most modem electricity meters, for example, are electronic meters (static meters).

Traditionally, meter reading personnel would periodically travel to each site where a utility meter was installed, inspect a meter installation and manually record consumption data. The customer would then receive a bill based on such collected data. Today, modem meters are increasingly equipped with Automatic Meter Reading (AMR) capabilities which allow utility meters to automatically communicate data to a remote location. Such technology greatly simplifies and lowers the cost of collecting consumption data for billing purposes.

One problem that confronts designers of utility meters comprising wireless AMR systems, where the utility meters are installed in underground enclosures, relates to the underground environment in which at least part of the AMR system is installed. Wireless AMR systems require a transmitting antenna that converts bound circuit fields into propagating electromagnetic waves. Notably, such antennas can also be configured to remove power from passing electromagnetic waves thereby receiving a transmitted signal. Electromagnetic waves can be deflected, attenuated, and even absorbed by non-RF transparent material, such as the material commonly found in underground enclosure environments. Consequently, a number of attempts have been made to provide a system specifically designed for transmitting data from an underground utility meter to a remote location. Examples of known antenna arrangements for use with underground utility meters are disclosed in U.S. Pat. No. 6,414,605 issued to Walden et al. and U.S. Pat. No. 5,298,894 issued to Cerny et al. and such disclosures are incorporated by this reference for all that they disclose.

One such prior art system comprises an above ground antenna connected to a below ground transmitter through a wired connection. Other prior art systems simply transmit a signal from within the underground enclosure. These prior systems have several design limitations. First, the transmitter is still located within the underground enclosure thereby potentially subjecting the transmitter and the connection between the transmitter and antenna to water contamination. Second, the attenuation inherent in the wired connection between the transmitter and the antenna results in a power loss which lowers system efficiency. Third, where the underground enclosure has a lid and where the antenna and/or transmitter is associated with such lid, removal of such lid without due care can result in damage to the wired connection between the transmitter and the antenna and/or the transmitter and the meter. Consequently, there is a need for a wireless AMR system that (1) improves efficiency by reducing the attenuation between the transmitter and the antenna, (2) better protects the transmitter from the underground enclosure environment, and (3) minimizes the potential of damage to the system when the underground enclosure top is removed.

Yet another issue that designers of utility meter technology face is supplying power to the meter electronics. In many utility meter environments, easily accessible power from an electrical utility grid is not available. As a result, such meter technology is often powered by a power source such a battery. Therefore, there is a need for an apparatus and method for extending the expected life of the power source, such an apparatus for recharging the power source or supplying the power source with a trickle.

SUMMARY

Objects and advantages of the invention will be set forth in the following description, or may be obvious from the description, or may be learned through practice of the invention.

Broadly speaking, a principal object of the present invention is to provide a method and apparatus for housing an AMR transmitter and antenna associated with a utility meter installed in an underground enclosure wherein said housing better protects the transmitter from the underground enclosure environment and provides for a more efficient transfer of energy between the transmitter and the antenna.

Another general object of the present invention is to provide a method and apparatus for housing an AMR transmitter and antenna associated with a utility meter installed in an underground enclosure having an enclosure lid, wherein said housing is associated with the enclosure lid and wherein said method and apparatus minimizes the potential of damage to the AMR system when the underground enclosure lid is removed.

Still another general object of the present invention is to provide an improved apparatus and method for supplying power to a battery operated transmitter.

Additional objects and advantages of the present invention are set forth in, or will be apparent to those skilled in the art from, the detailed description herein. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

One exemplary embodiment of the present invention relates to a novel communication device for transferring data from an electronic device installed in an underground pit to a remote location. The communication device comprises a housing associated with a pit lid that is at least partly detachable from the underground pit enclosure and at least partially covers the underground pit enclosure. The pit lid has an opening that provides access from outside the pit to the inside of the pit. The communication device comprises an enclosure having a top-section and a depending base, wherein said top-section generally rests on top of the pit lid and wherein said depending base extends from said top-section to a point at least partly through the pit lid opening. The top-section at least partially houses a circuit board comprising a transmitter. The transmitter is associated with an antenna that is also at least partially enclosed by said top-section. The antenna is suitably configured for propagating data-signals generated by the transmitter. The transmitter is associated with a meter enclosed inside the pit enclosure through a transmitter-meter communication link. Some embodiments of the circuit board may further comprise data-logger circuitry and touch-pad technology.

A power source is associated with the circuit board for supplying power to the transmitter. The power source may be directly attached to the circuit board, the power source may be disposed in the depending base or it may be installed within the pit enclosure. When disposed within the pit enclosure, the power source is associated with the circuit board via a power-buss, wherein the power-buss is associated with the power source at a first access point, extends through the depending base and is associated with the circuit board at a second access point. The power source may be a battery which may be supplied with a trickle charge from a photovoltaic device or a betavoltaic device.

The transmitter-meter communication link may be wired or wireless. For wired communication links, a multiple conductor data-cable may be used with some embodiments also comprising a terminal block for making and breaking conductor connections. One embodiment of a multiple conductor data-cable comprises a ground conductor, a first data conductor for receiving data, and a second data conductor for sending data. For embodiments where the communication link is a wireless link, a receiver is associated with the circuit board suitably configured for receiving a transmitted signal from a low power transmitter associated with the meter.

Yet another exemplary embodiment of the present invention relates to an RF module for transmitting data from an electronic device to a remote location wherein the electronic device is installed in an underground pit enclosure. The pit enclosure is covered by a pit lid that is generally at ground level with an opening there through. The RF module comprises a housing having a top-section and a depending base, wherein the top-section generally rests on top of the pit lid and wherein the depending base extends from the top-section to a point at least partly through the pit lid opening. A RF transmitter is disposed at least partially inside the top-section and is associated with an antenna situated at least partially inside the top-section. Data-signals generated by the transmitter are propagated by said antenna to a remote location.

The module further comprises a power source associated with the RF transmitter for supplying power to the RF transmitter. The power source may be disposed within said pit enclosure, wherein said power source is associated with the circuit board via a power-buss. The power-buss is associated with the power source at first end, extends through the depending base and is associated with the circuit board at a second end. For one embodiment, the power source is at least one battery. Acceptable battery technology includes "nuclear batteries" based on betavoltaic technology. Additionally, conventional batteries may be used and supplied with a trickle charge from at least one of (a) a photovoltaic device and (b) a betavoltaic device to extend battery life.

For this embodiment, the RF module is in communication, via a communication-link, with an electronic device associated with a meter register located within the pit enclosure. System-data is transferred between the RF module and the electronic device through such communication link. The communication link may be wired or wireless. For a wireless link, the electronic device comprises a transmitter and the RF module further comprises a receiver suitably configured for receiving system-data transmitted from the electronic device.

Still another embodiment of the present invention relates to a transmitter module for transmitting data from an electronic device to a remote location wherein the electronic device is installed in an underground pit enclosure. The pit enclosure is associated with a detachable pit lid that is generally at ground level. The transmitter module comprises a module pit lid suitably sized to replace the original detachable pit lid. A battery operated RF transmitter is disposed within the module pit lid. The RF transmitter is associated with an antenna suitably configured to propagate to a remote location data-signals generated by said RF transmitter. The communication link is suitably configured for transferring system-data between the RF transmitter and the electronic device.

Still a further embodiment of the present invention relates to an RF module configured for transmitting data from an electronic device to a remote location wherein the electronic device is installed in an enclosure having opening there through. The RF module comprises a housing having a first chamber and a second chamber, wherein said first chamber rests generally adjacent to said opening and wherein said second chamber extends from said first chamber to a point at least partly through the opening. A RF transmitter is disposed at least partially inside the first chamber and is associated with a power source. A communication link is provided for transferring system-data between the RF transmitter and the electronic device disposed within the enclosure. The module further comprises an antenna situated at least partially inside the first chamber and associated with said RF transmitter whereby data-signals generated by the transmitter are propagated by the antenna to a remote location. Such data-signals comprise at least part of the system-data.

The power source may be disposed within the enclosure and associated with the RF transmitter via a power-buss running through the enclosure opening. The power-buss may include a first access point and a second access point wherein the first access point is associated with the power source and wherein the second access point is associated with the transmitter. The power source may be a battery or any other suitable device for supplying power to the transmitter. For embodiments where the power source is a battery, such battery may be supplied with a trickle charge from at least one of (a) a photovoltaic device and (b) a betavoltaic device.

The module may further comprise a receiver associated with the RF transmitter. The receiver is suitably configured for receiving a transmitted signal from the electronic device within the enclosure or signals transmitted from outside the enclosure.

Another exemplary embodiment of the present invention concerns methodology for detachably associating a transmitter module with a lid that at least partially covers an underground enclosure. The lid comprises an opening there through for providing access to the inside of the enclosure. A housing is provided for enclosing the transmitter and antenna. The housing preferably comprises a top-section and a depending base, wherein the top-section generally rests on top of said lid with the depending base extends at least partially through the opening in the pit lid. Next a battery operated transmitter associated with an antenna is disposed within the top-section. The antenna is suitably configured for propagating data-signals generated by said transmitter to a remote location. Next, at least one battery is operatively associated with the transmitter for providing power to the transmitter. The battery may be disposed within said depending base or anywhere inside the enclosure. Alternatively, the battery may be disposed underneath the lid and operatively connected to the transmitter via a wired connection that runs through the depending base.

A communication link is also provided for transferring system-data between an electronic device disposed within the pit and the transmitter.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
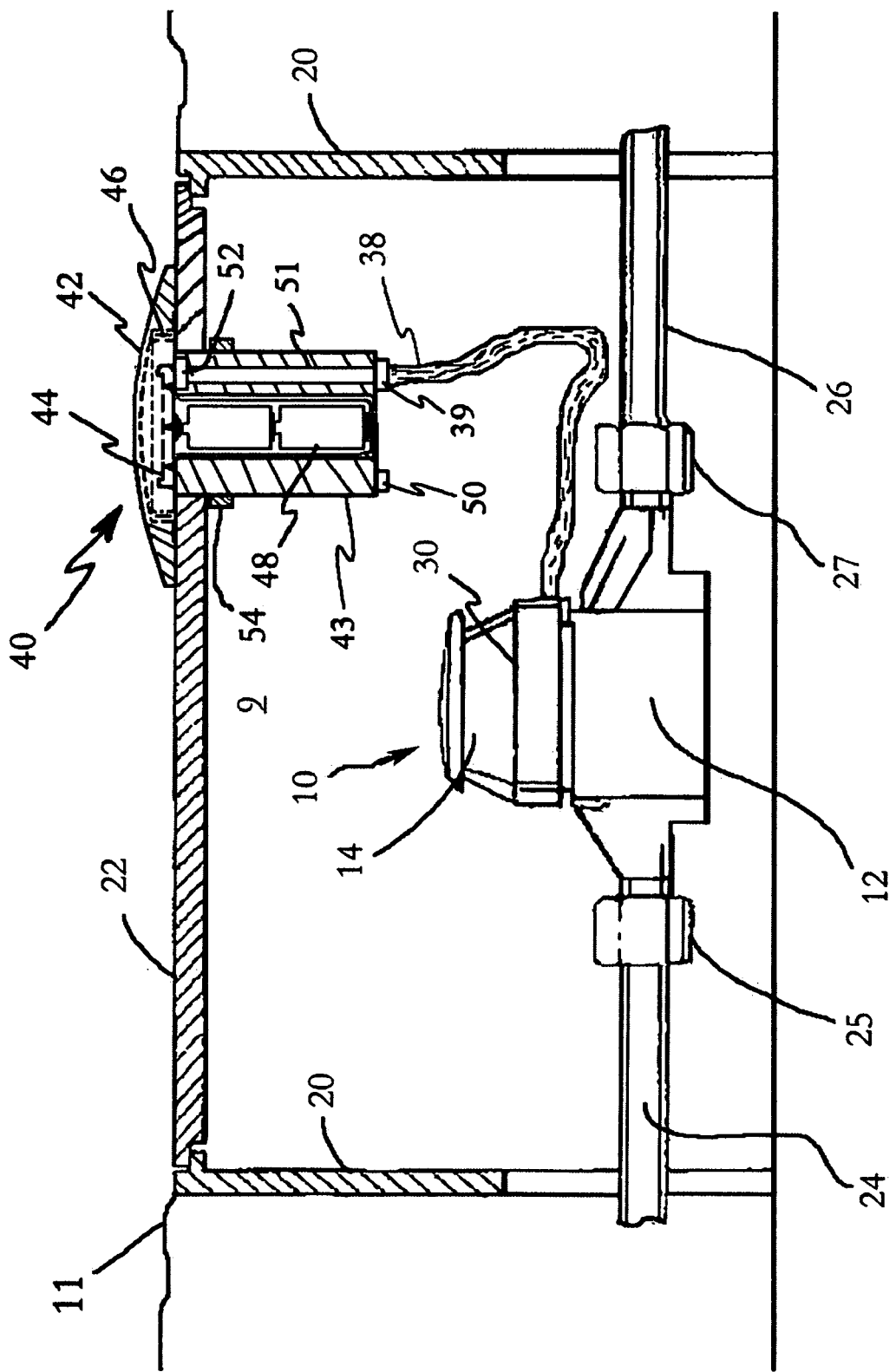
FIG. 1 is a graphic illustration of a side view of an in ground pit (9) enclosure, including a partial cut away section, housing a fluid meter attached to a communication apparatus.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

While the particulars of the present invention may be adapted for use providing Automatic Meter Reading (AMR) capabilities and associated technology to utility meters metering the consumption of commodities such as gas, water, oil, electricity, etc., the examples discussed herein are primarily in the context of water consumption.

FIG. 1 shows a side view, including a partial cutaway section, of an exemplary water meter (10) configured with Automatic Meter Reading (AMR) technology wherein the meter is housed in a below ground enclosure (9), hereafter referred to as pit (9). Pit (9) is shown comprising sides (20) and lid (22). Water meter (10) is shown comprising a fluid chamber (12) and a register (14). The bottom of register (14) releasably attaches to the top of fluid chamber (12) forming an enclosed void (not shown) between register (14) and fluid chamber (12). Fluid chamber (12) comprises water inlet (25) and water outlet (27). Water line (24), connects to a water source at one end, runs into pit (9) and attaches to fluid chamber inlet (25) at the opposite end. Water line (26) attaches to fluid chamber outlet (27) at one end and continues through pit (9) to a water consumer. Fluid chamber (12) further houses a rotating element (not shown) that is placed in the path of fluid flow through the meter. The rotating element may be constructed of magnetic material or, alternatively, may be associated with magnetic material (e.g. a magnet). As the rotating element rotates in response to fluid flow through meter (10), a rotating magnetic field is generated. It will be appreciated that the rotating element in fluid chamber (12) may be replaced by other technologies that create other types of magnetic fields that vary over time (e.g. an oscillating element that generates an oscillating magnetic field) without departing from the scope of this invention.

Register (14) houses elements for detecting a rotating magnetic field and associating such rotations with water consumption thereby generating resource consumption data. Register (14) may also houses components for displaying consumption data. Alternatively, Register (14) may simply output pulses to an electronic device associated with register (14) wherein such pulses are relatable to the amount of water flowing through meter (10). Such technology is well known and understood by those skilled in the art, and a detailed explanation thereof is not necessary for purposes of describing the method and system according to the present invention.

Figure 2A:
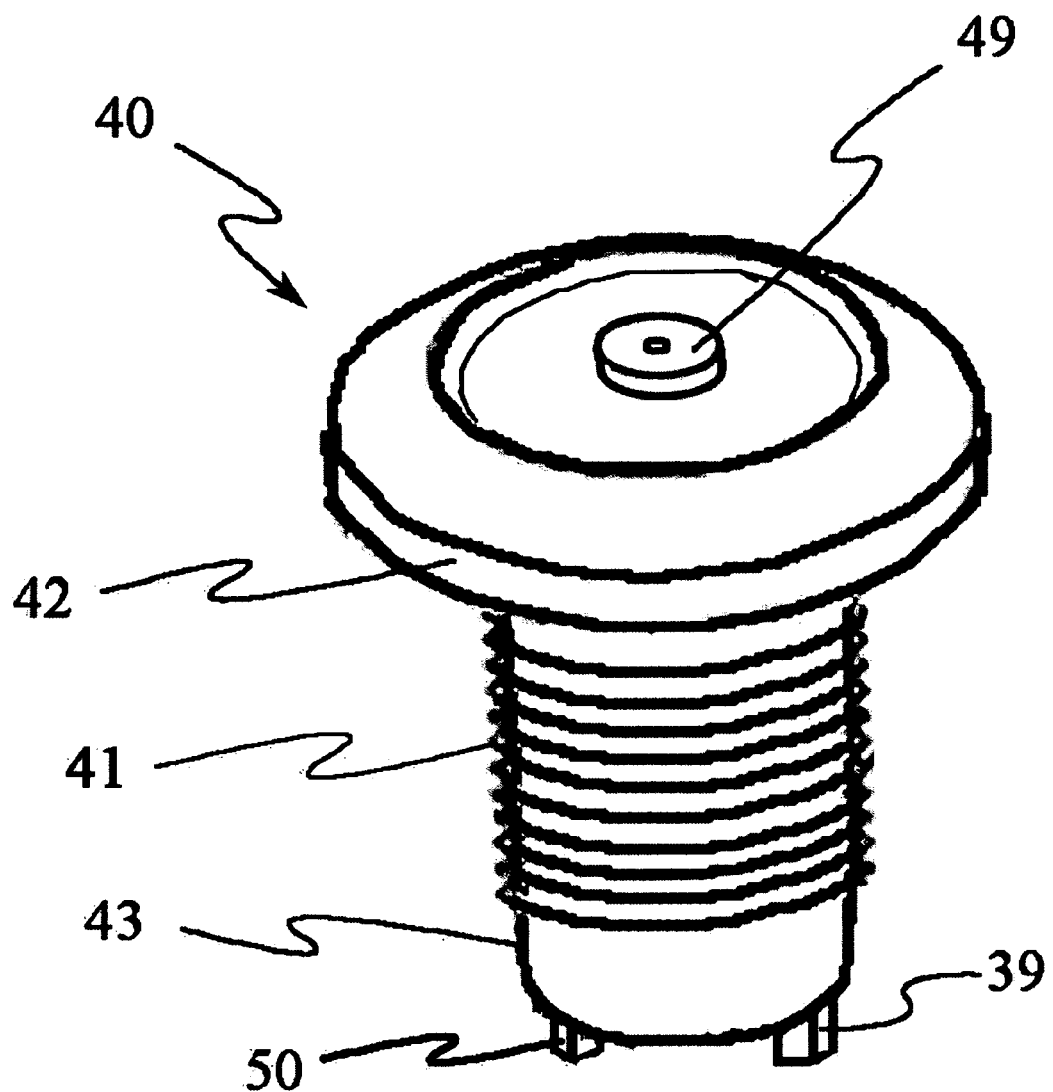
FIG. 2a is a side view perspective view of one exemplary embodiment of a communication apparatus with securing nut (54)
Figure 2A:
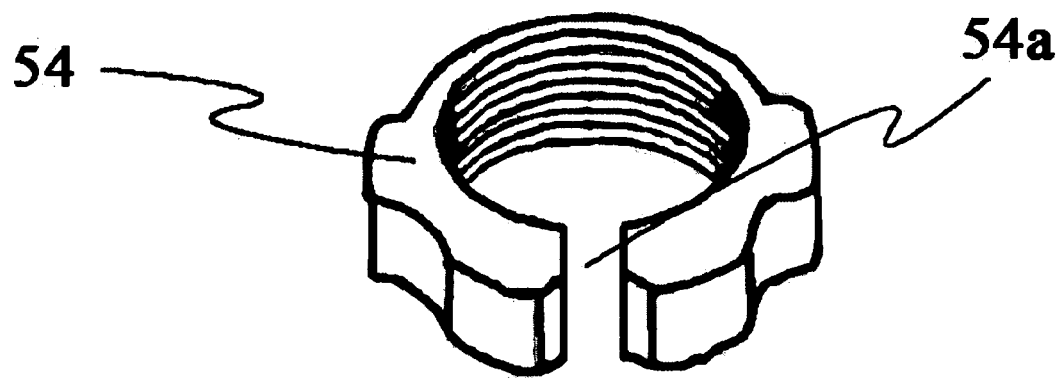

Also shown in FIG. 1 is a communication apparatus (40) for transmitting data from meter (10) to a remote location. Communication apparatus (40) comprises an enclosure having a top-section (42) and a depending base (43). Top-section (42) rests generally on top of the pit lid (22) substantially adjacent to an opening through the pit lid. Depending base (43) extends from top-section (42) to a point at least partly through the pit lid opening. As can be seen in FIG. 1, depending base (43) extends completely through pit lid (22). For this embodiment of the invention, communication apparatus (40) is associated with meter (10) through a wire communication link (38). As shown in FIG. 2a, depending base (43) may further comprise threads (41) suitably sized for receiving securing nut (54). Securing nut (54) may include gap (54a) to provide a means for installing and removing securing nut (54) without disconnecting communication link (38).

Figure 1B:
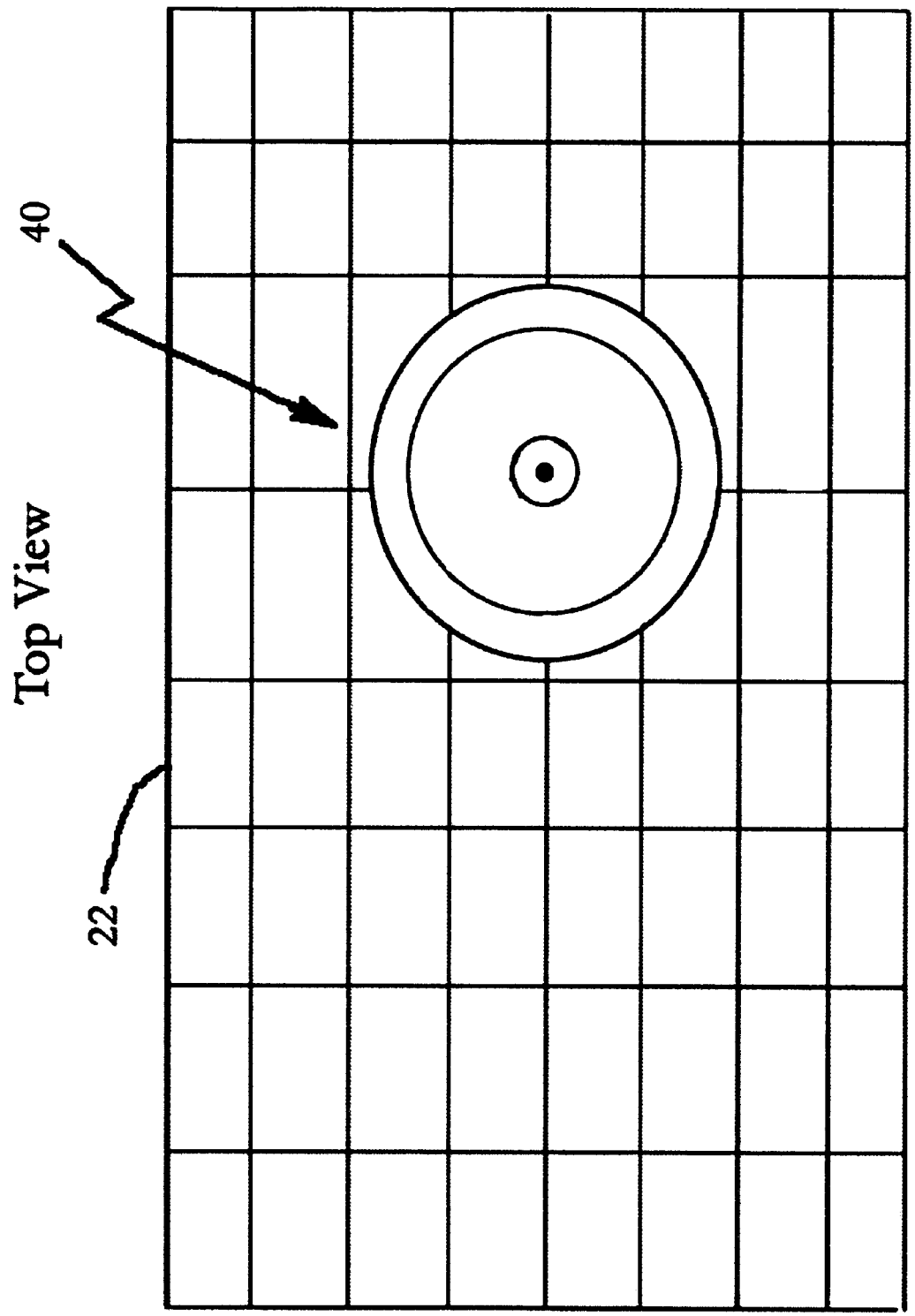
FIG. 1b is a top view a one exemplary embodiment of a communication apparatus resting generally on top of a pit lid (22)

FIG. 1b shows a top view of communication apparatus (40) resting generally on top of pit lid (22). Coil/core interface (49) is shown in the center of top-section (42) although interface (49) may be located anywhere on top-section (40) without departing from the scope of the present invention. It should be noted that for the meter installation shown in FIG. 1, pit lid (22) is generally at ground level. It will be appreciated, however, that communication apparatus (40) may be installed in above ground enclosures pit lid (22) may be the side of such enclosure without departing from the scope and spirit of the present invention.

Figure 2B:
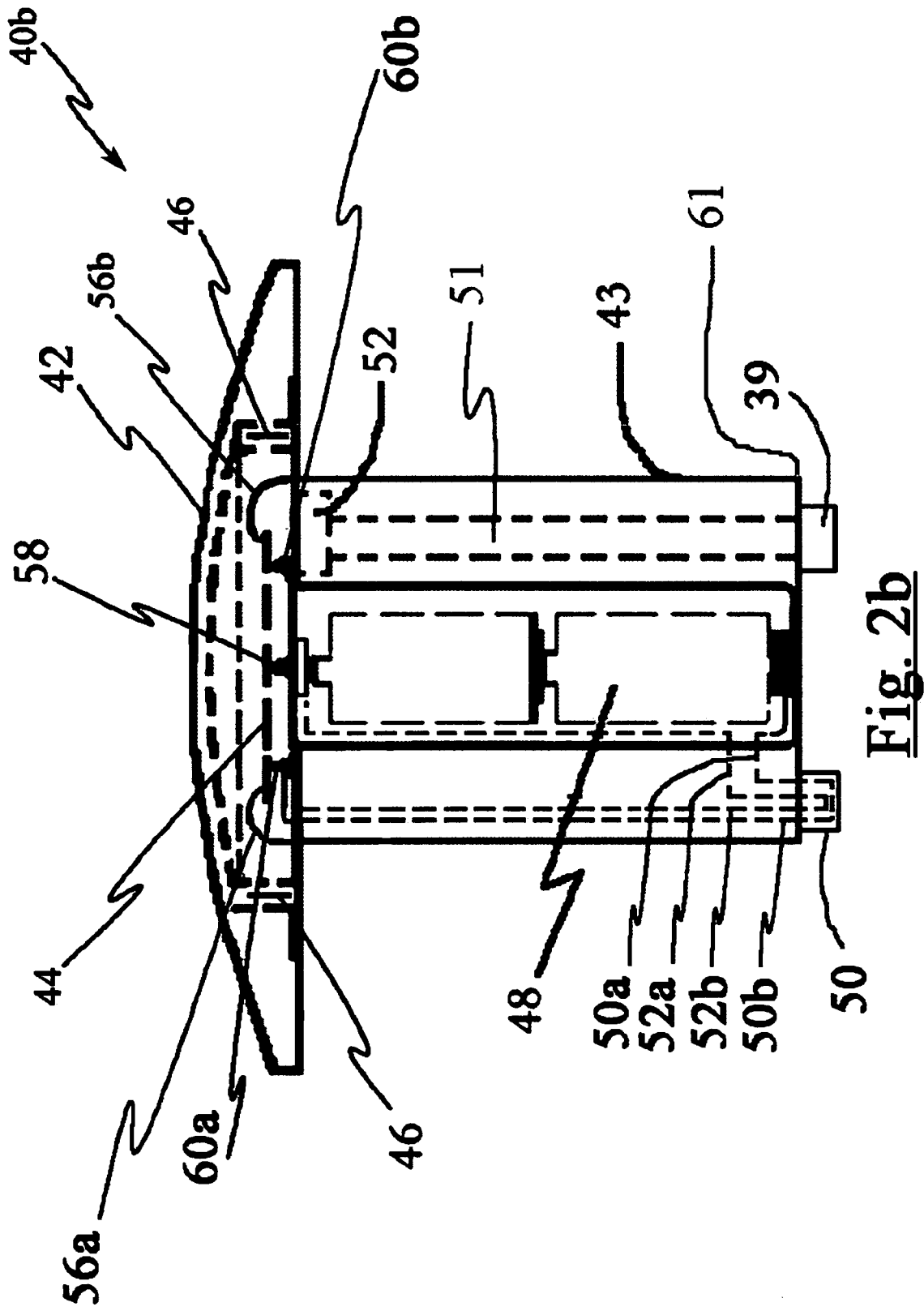
FIG. 2b is a side view, with a partial phantom view, of a communication apparatus housing comprising a top-section and a depending base.

Referring now to FIG. 2b, a side view, including a partial phantom view, of one embodiment of communication apparatus (40) is shown. Communication apparatus (40) has a circuit board (44) disposed within top-section (42) and supported by stand-offs (58, 60a, 60b). Circuit board (44) may also be secured in top-section (42) by plastic grip tabs integral to the housing or any other suitable means. For this embodiment, stand-off (60a) and stand-off (60b) also provide a ground connection between circuit board (44) and power source (48) (described later). Stand-off (58) provides a power connection to circuit board (44). Resilient board clips (56a, 56b) secure circuit board (44) against the stand-offs thereby securing the circuit board within top-section (42). Such resilient clip/stand-off technology provides for a bolt/screw free design that simplifies assembly and lowers manufacturing costs.

Figure 3:
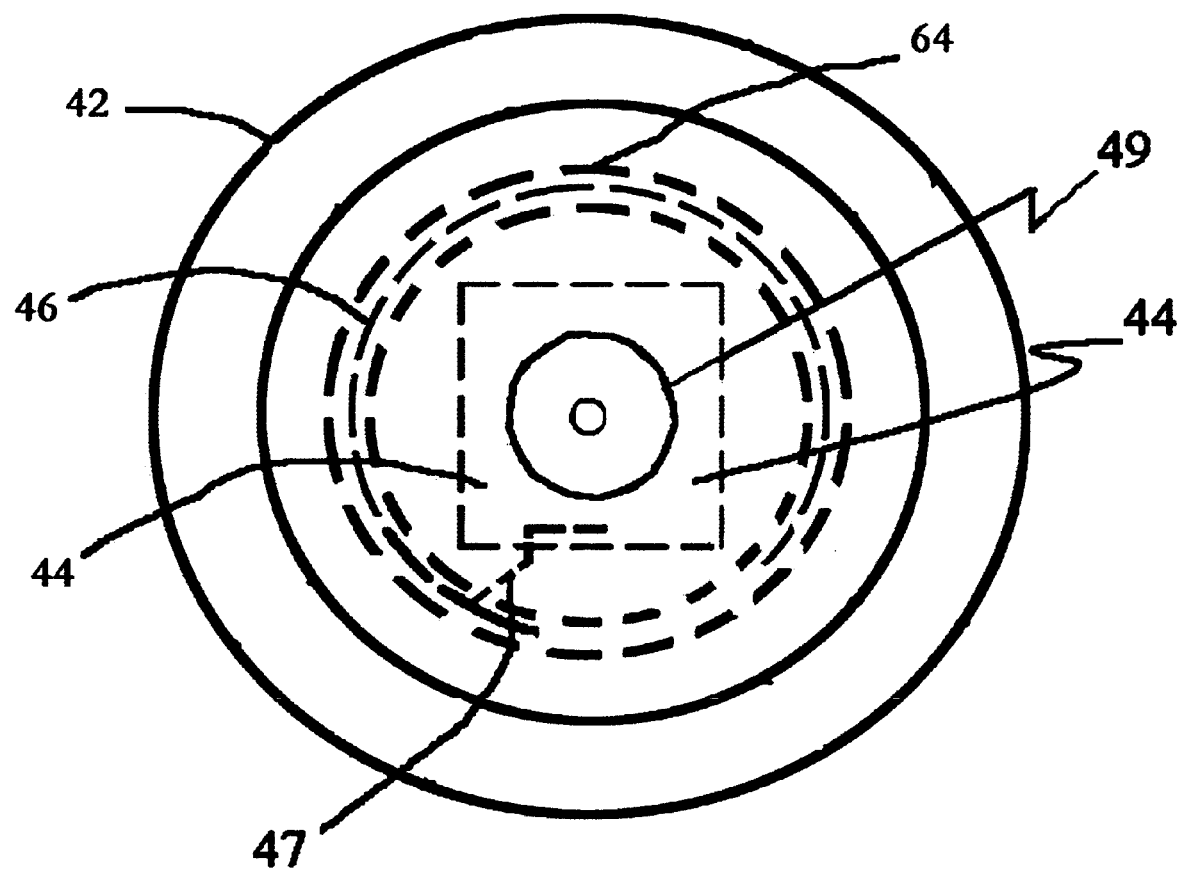
FIG. 3 is a top view, including a partial phantom view, of top-section (42)

Circuit board (44) comprises transmitter circuitry (one exemplary transmitter is described below) associated with antenna (46). It should be noted that the transmitter circuitry may be associated with any type of substrate other than a circuit board without departing from the scope and spirit of the disclosed inventions. Both circuit board (44) and antenna (46) are at least partially disposed within top-section (42). Additionally, antenna (46) may be disposed at least partially outside of top-section (42) to facilitate an improved electromagnetic radiation pattern. Alternatively, antenna (46) by be integral to circuit board (44), such as a trace or a slot antenna formed on/within circuit board (44). As shown in FIG. 3, for this embodiment of the invention, antenna (46) is positioned in antenna guide (64) and at least partially circles circuit board (44). Any type of suitable antenna technology may be used and such antenna technology is well known and understood by those skilled in the art, and a detailed explanation thereof is not necessary for purposes of describing the method and system according to the present invention.

Antenna (46) is coupled to the transmitter circuitry via connector (47). Notably, any suitable apparatus or method may be used for associating antenna (46) directly or inductively to the transmitter circuitry so that data-signals generated by the transmitter are propagated by antenna (46) to a remote location. Exemplary remote locations include a hand held computer, perhaps just a few feet away from the meter installation or hundreds of feet away. A remote location may be in a vehicle equipped with a receiver wherein the vehicle is driven by the meter installation. Depending on the transmitter power level, a remote location may be miles away from the meter installation site.

As shown in FIG. 2b, a power source (48) is associated with circuit board (44) via wired connections (50a, 50b, 52a, 52b) and is configured for supplying power to the circuitry on circuit board (44). For this embodiment of the present invention, power source (48) comprises two batteries connected in series and disposed within depending base (43). It will be appreciated that power source (48) may only comprise one battery or three or more batteries without departing from the scope and spirit of the invention.

As noted earlier, the transmitter circuitry is associated with meter (10) through a wired transmitter-meter communication link (38) (FIG. 1). For this embodiment of the invention, wired conductors provide a connection between register (14) and depending base connector (39). A communication link runs through conduit (51) to communication connection (52) associated with transmitter board (44). Transmitter-meter communication link (38) is configured for transferring system-data between the transmitter and the meter. System-data is any data generated by meter (10), communication apparatus (40), or stored by a memory associated with the meter (10) or the communication apparatus (40). Exemplary system-data includes a meter identification number, consumption data, tamper data, battery status data, time data, system diagnostic data, or any other type of data. Transmitter-meter communication link (38) will be described in more detail below.

For meter installations located in hostile environments, such as water meter installations, the components within communication apparatus (40) should be adequately protected. For this embodiment of the invention, a potting compound or a sealing material may be use to protect various components of communication apparatus (40). Any suitable potting compound may be used including polymer based materials such as polyurethane or a fiberglass base material. Additionally, suitable sealants include a vulcanizing adhesive/sealant. The potting/sealing material may be injected into the housing thereby encasing substantially all of the top-section (42) components and depending base (43) components within the housing. It will be appreciated that when a potting material/sealant is used to encase the components within top-section (42) and depending base (43) as described above, such components can no longer be accessed for replacement or repair.

Alternatively, the housing may be constructed such that only the distal end (61) of depending base (43) has an opening allowing access to the inside of the housing. The distal end (61) may be sealed by a removable end cap (not shown) to prevent contaminates from reaching components within the housing. Such an arrangement could be configured to allow the components within top-section (42) and depending base (43) to be accessed for replacement or repair. It will be appreciated that any type of sealing material or method of sealing the internal components of top-section (42) and depending base (43) within the housing may be used without departing from the scope of the invention.

Referring back to FIG. 2b, power source (48) is now considered. For this embodiment of the present invention, power source (48) is preferably two AA lithium batteries although any type and number of batteries may be used without departing from the scope of the invention. Power source (48) is associated with circuit board (44) through a multiple conductor wired connection (50a, 50b, 52a, 52b). Conductor (50a) attaches to the negative component of power source (48) at one end, and to auxiliary power connector (50) at the other end. Conductor (50a) is coupled to conductor (50b) within auxiliary power connector (50). Conductor (50b) provides an electrical connection between stand-off post (60a), stand-off post (60b), and conductor (50a). Similarly, conductor (52a) attaches to the positive component of power source (48) at one end, and to auxiliary power connector (50) at the other end. Conductor (52a) is coupled to conductor (52b) within auxiliary power connector (50). Conductor (52b) provides an electrical connection between stand-off post (58) and conductor (52a). One of ordinary skill in the art will appreciated that auxiliary power connector (50) provides a method of connecting additional power sources to communication apparatus (40) as well as providing a means for disconnecting power source (48) from circuit board (44). Such a configuration is particularly useful when power source (48) is encased in a potting material as described above.

Figure 4:
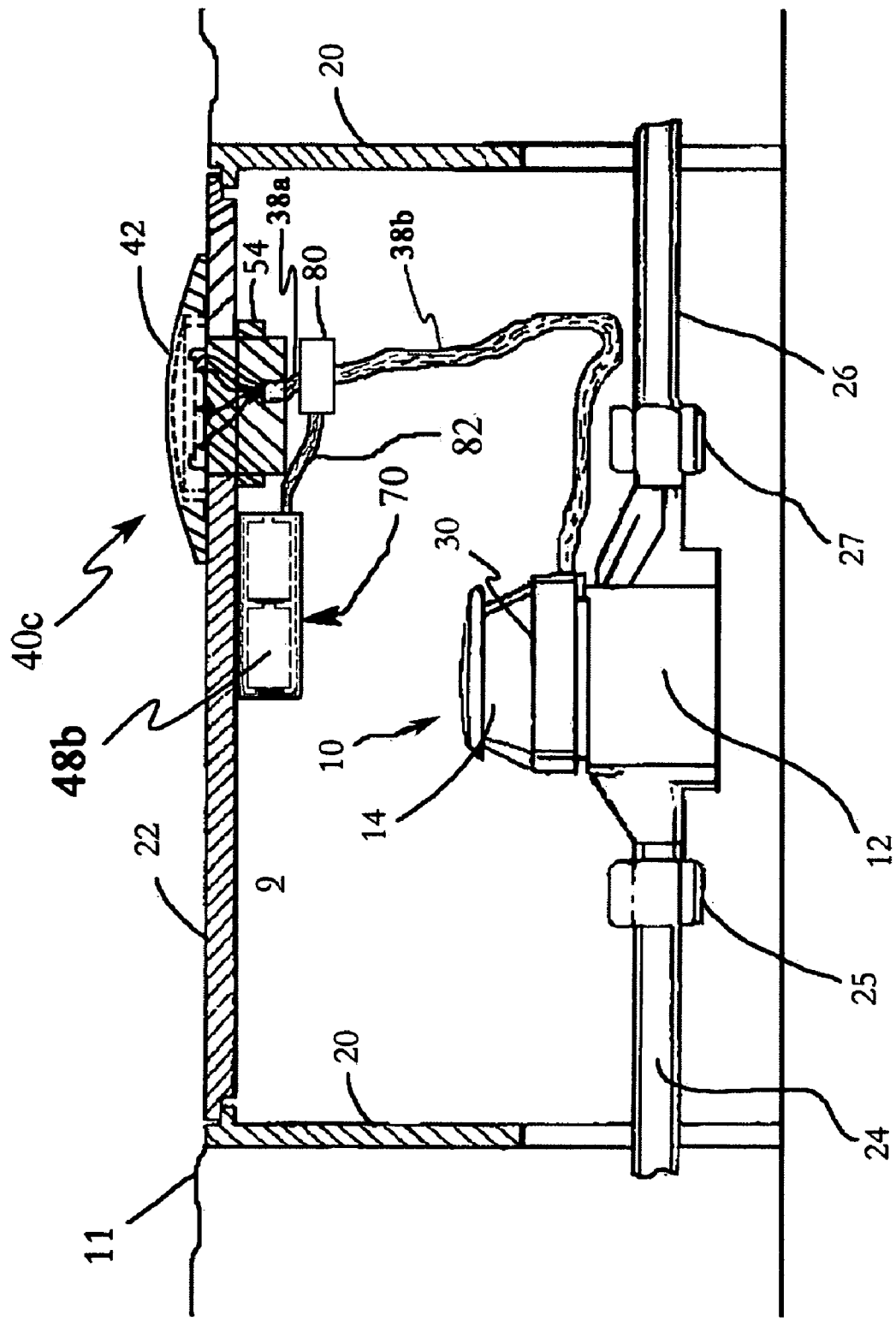
FIG. 4 is a graphic illustration of a side view of an in ground pit (9) enclosure, including a partial cut away section, housing a fluid meter attached to a communication apparatus with a separate power pack.

Referring now to FIG. 4, a side view, including a partial cutaway section, of an alternative embodiment of the present invention is depicted. For this embodiment, depending base (43) does not house the power source. It should be noted that while depending base (43) is shown extending through pit lid (22) such a configuration is not required. Power pack (70) is shown attached to the under side of pit lid (22) and associated to circuit board (44) via a power-buss (82). Power-buss (82) preferably comprises a power conductor and a ground conductor and runs through the pit lid, via depending base (43). Power-buss (82) may comprise a first access point and a second access point wherein the first access point is associated with the power source (48b) and the second access point is associated with the circuit board (44). Other access points may be provided to allow power connections to other electronic devices associated with communication apparatus (40).

Figure 5:
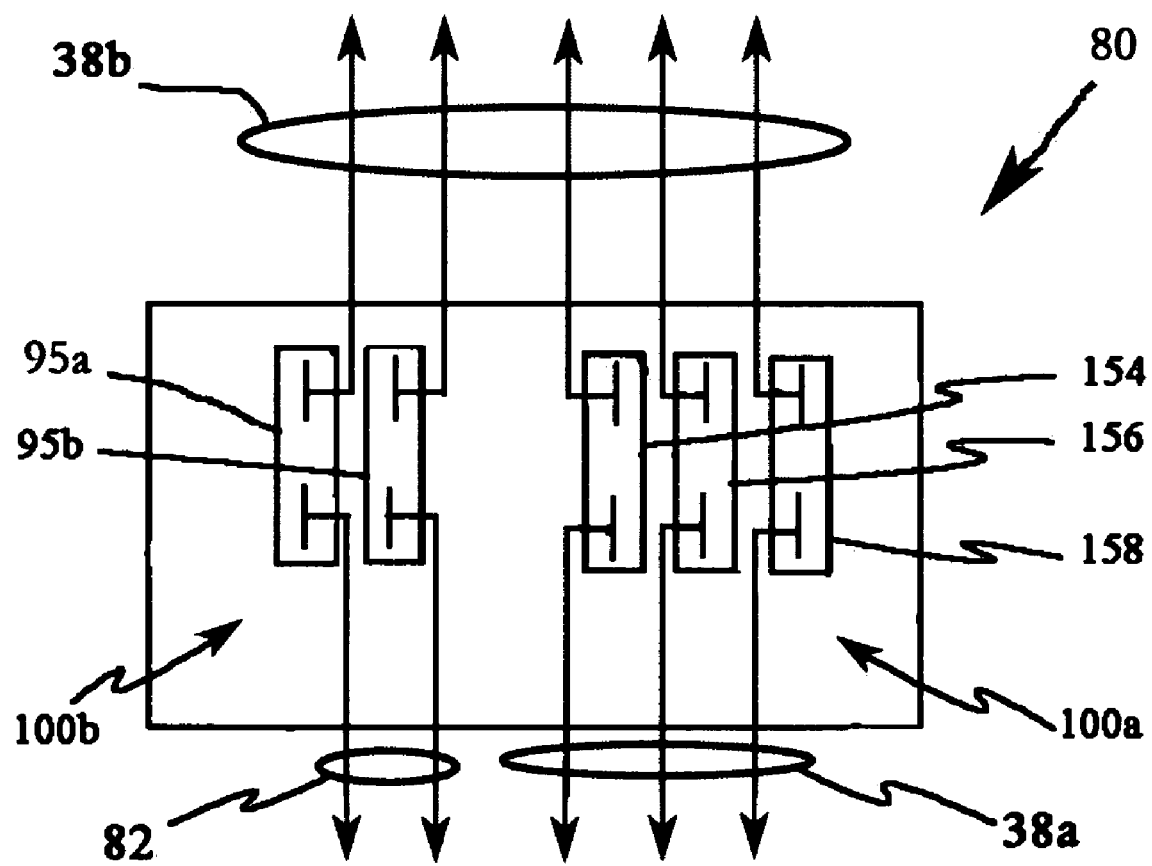
FIG. 5 is a schematic illustration of terminal block (80) for making and breaking connections in a communication link between a communication apparatus and a meter.

Additionally, the power conductor of power-buss (82) may be routed through terminal block (80). Terminal block (80) includes at least one node (i.e. junction) configured for (i) making a connection to the power conductor, (ii) breaking a connection to the power conductor, and (iii) for making and breaking the power conductor connection between the circuit board (44) and the power source (48b). As shown in FIG. 5, the power conductor and a ground conductor of power-buss (82) are both routed through terminal block (80). The power conductor connects to node (95a) while the ground conductor connects to node (95b). Such conductors exit terminal block (80) and are combined with the conductors in communications link (38b) where they eventually are placed in electrical contact with circuit board (44). Such nodes (95a, 95b) may be used to make and break the electrical contact between the power source (48b) and circuit board (44). Additionally, such nodes may be used to attach additional power sources to power-buss (82). While FIG. 5 shows both the power conductor and the ground conductor being routed through terminal block (80), it should be noted that only one such conductor or no power-buss (82) conductors may be routed through terminal block (80). The term "node", as used in this document, simply refers to either a junction for making and breaking an electrical connection, or a terminal point at which two or more branches of a circuit meet (i.e. a point that is common to two circuits).

Figure 6:
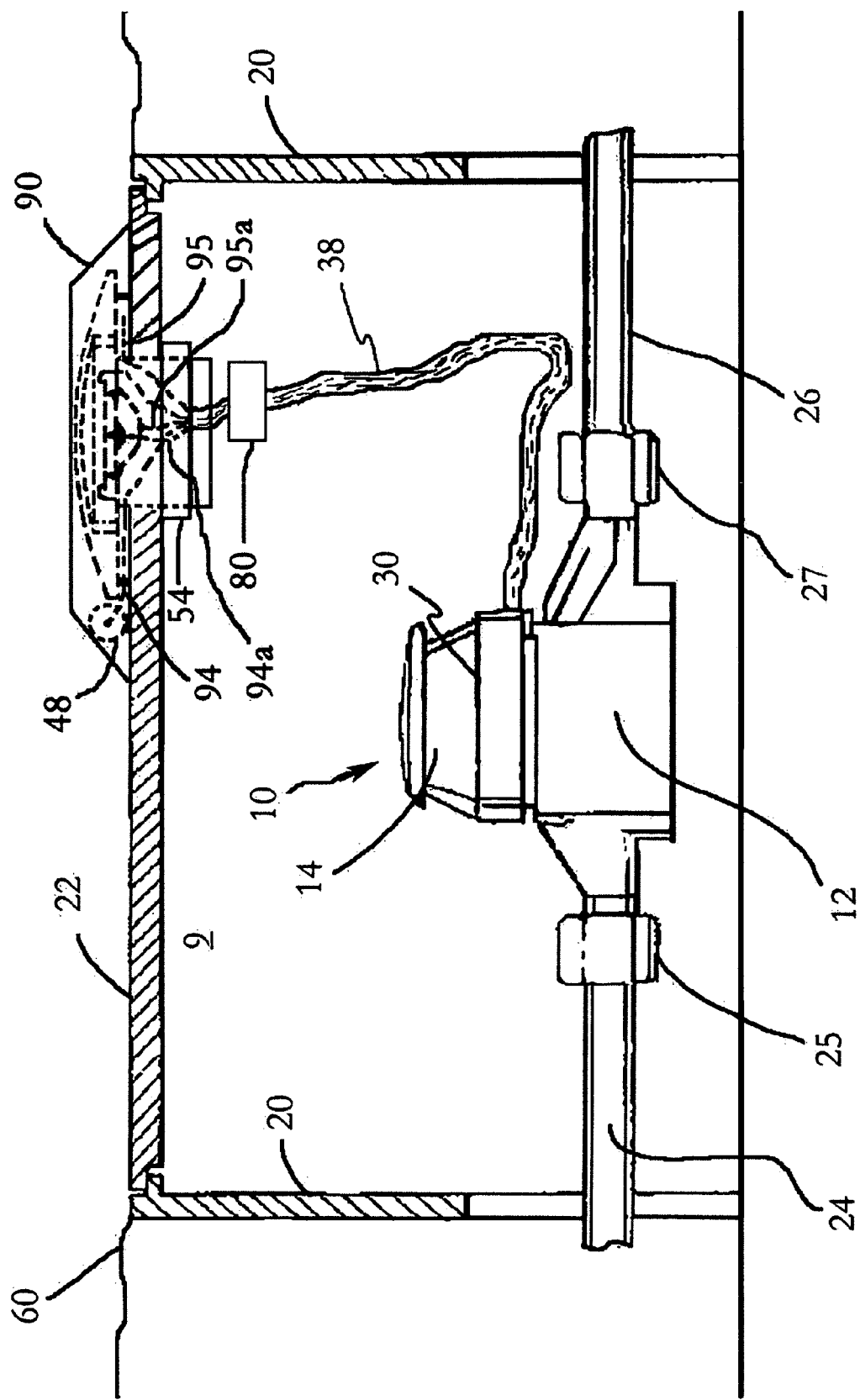
FIG. 6 is a graphic illustration of a side view of an in ground pit (9) enclosure, including a partial cut away section, housing a fluid meter attached to a communication apparatus comprising a energy converter for recharging or supplying a trickle charge to a power source.

Referring now to FIG. 6, another alternative embodiment of the present invention is disclosed. For this embodiment of the present invention, power source (48), the transmitter and antenna (64) are all located above pit lid (22). Power source (48) comprises a rechargeable battery pack connected to an energy-converter (90). An energy-converter is simply a device that converts energy from one form to another. One example of an energy-converter is photovoltaic-radome (90) which generates electricity by absorbing electromagnetic radiation. Another example of an energy-converter is a betavoltaic device (described later).

Figure 7:
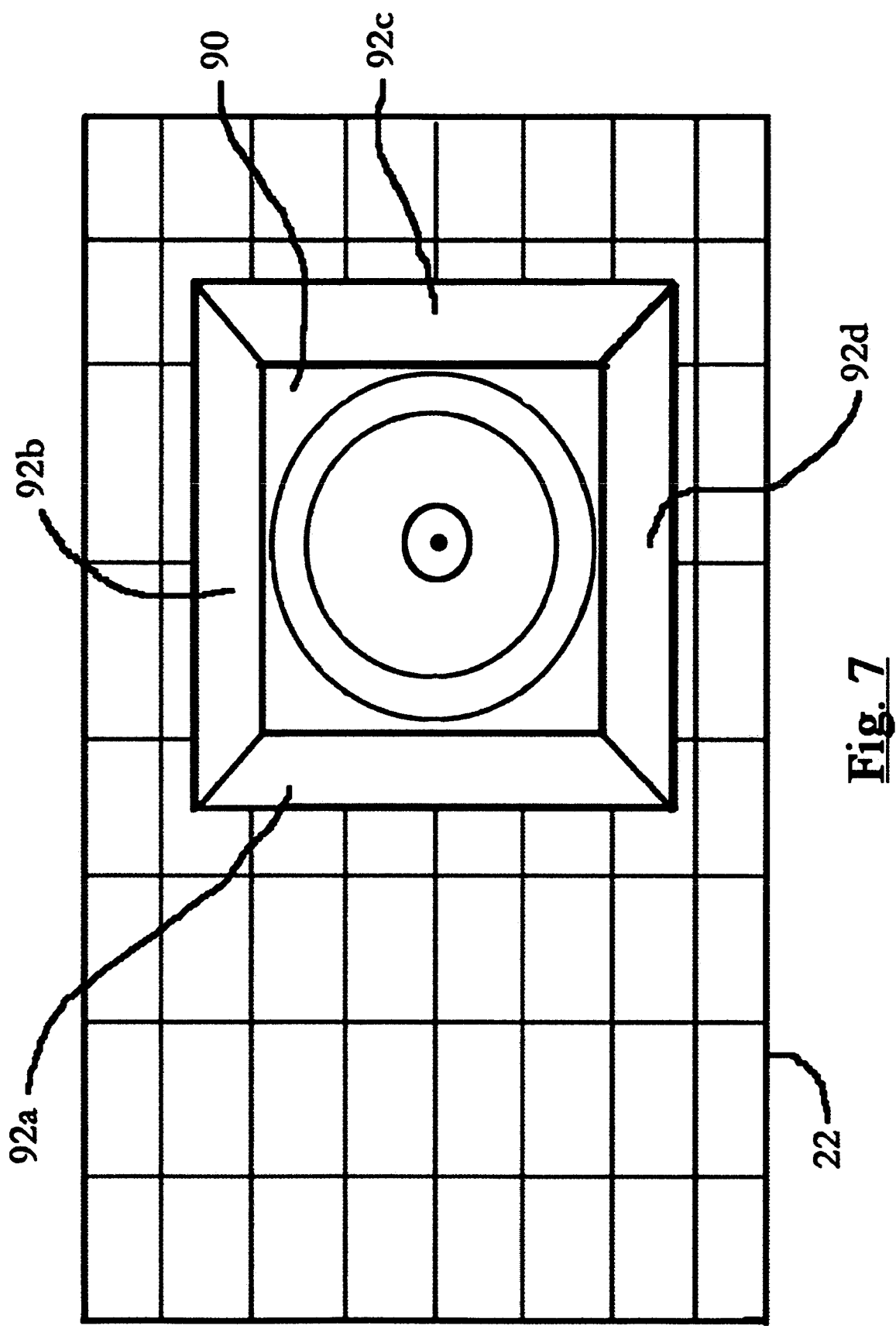
FIG. 7 is a top view of pit lid (22) and a communication apparatus comprising an energy converter.
Figure 8:
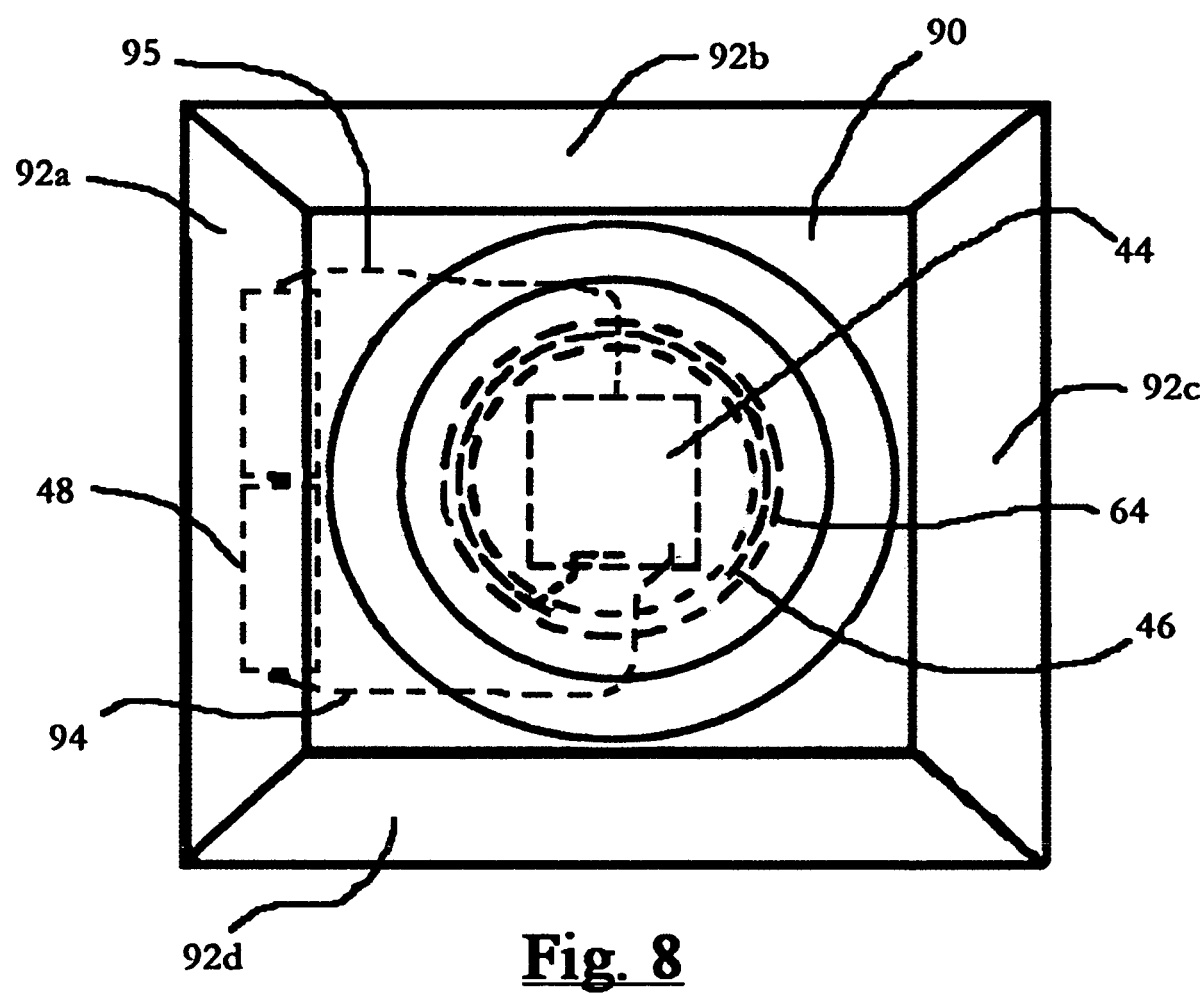
FIG. 8 is a top view of pit lid (22) and a communication apparatus comprising a energy converter including a phantom view of an above pit lid power source connected to circuit board (44)

FIG. 7 shows a top view of communication apparatus (40) comprising energy converter (90). FIG. 8 also shows a top view of communication apparatus (40) with an additional phantom image of power source (48) connected to circuit board (44) via power conductor (94) and ground conductor (95). For this embodiment of the invention, energy converter (90) has four sections of photovoltaic cells (92a, 92b, 92c, 92d) surrounding top-section (42). It will be appreciated that the number and shape of sections (92a-92d) and the number and shape of photovoltaic cells comprising each section may vary depending on any number of parameters including: cost, anticipated installation conditions, antenna design requirements, and power requirements. For the preferred embodiment, each photovoltaic cell section includes three photovoltaic cells, each supplying about 0.5 volts at 30-50 milliamps in full sunlight. Such photovoltaic cells are preferably connected in series to provide power to communications apparatus (40) and/or supply a charging current to power source (48). Additionally, to lower costs, the number of photovoltaic cells may be reduced to supply a simple trickle charge to power source (48) thereby extending the expected life of power source (48).

Similarly, power to communications apparatus (40) may be supplied by a betavoltaic device. The betavoltaic device uses a plurality of PN junctions in silicon to capture and convert electrons emitted from a radioactive gas, such as tritium, into a current. The PN junctions are arranged so as to form a "Dyson shell" surrounding the radioactive gas. To further increase efficiency, the surface area of the silicon surface is increased by adding indentions in such surface. Such indentions are preferably about 1 µm wide and about 40 µm deep. The size of the Dyson shell is selected depending on the application. A relatively smaller shell is selected when the betavoltaic device supplies a trickle charge to power source (48) compared to a relatively larger size shell when the betavoltaic device is used as power source (48) (i.e. a nuclear battery). The Dyson shell may take any suitable form including a sphere, a rectangular box, or a cylindrical tube similar in shape to a typical battery. The techniques for interconnecting PN junctions to form a shell as well as the techniques for adding indentions to the surface of PN junctions are well known in the art and a detailed explanation thereof is not necessary for purposes of describing the method and system according to the present invention.

In yet another embodiment of the invention, the above described hosing comprising top-section (42) and depending base (43) may be formed integral to a pit lid forming a one piece module. Alternatively, the pit lid may be configured to house the various components described above. For this embodiment of the invention, the module comprises a module pit lid suitably sized to replace pit lid (22). A battery operated RF transmitter is disposed within the module pit lid. As described above, the RF transmitter is associated with an electronic device through either a wired or wireless communication link configured for transferring system-data between the RF transmitter and the electronic device. The electronic device may be register (14) or some other device in communication with register (14). An antenna is also associated with the RF transmitter and configured for propagating data-signals generated by the RF transmitter to a remote location outside the pit. As before, such data-signals may comprise at least part of said system-data.

Figure 9:
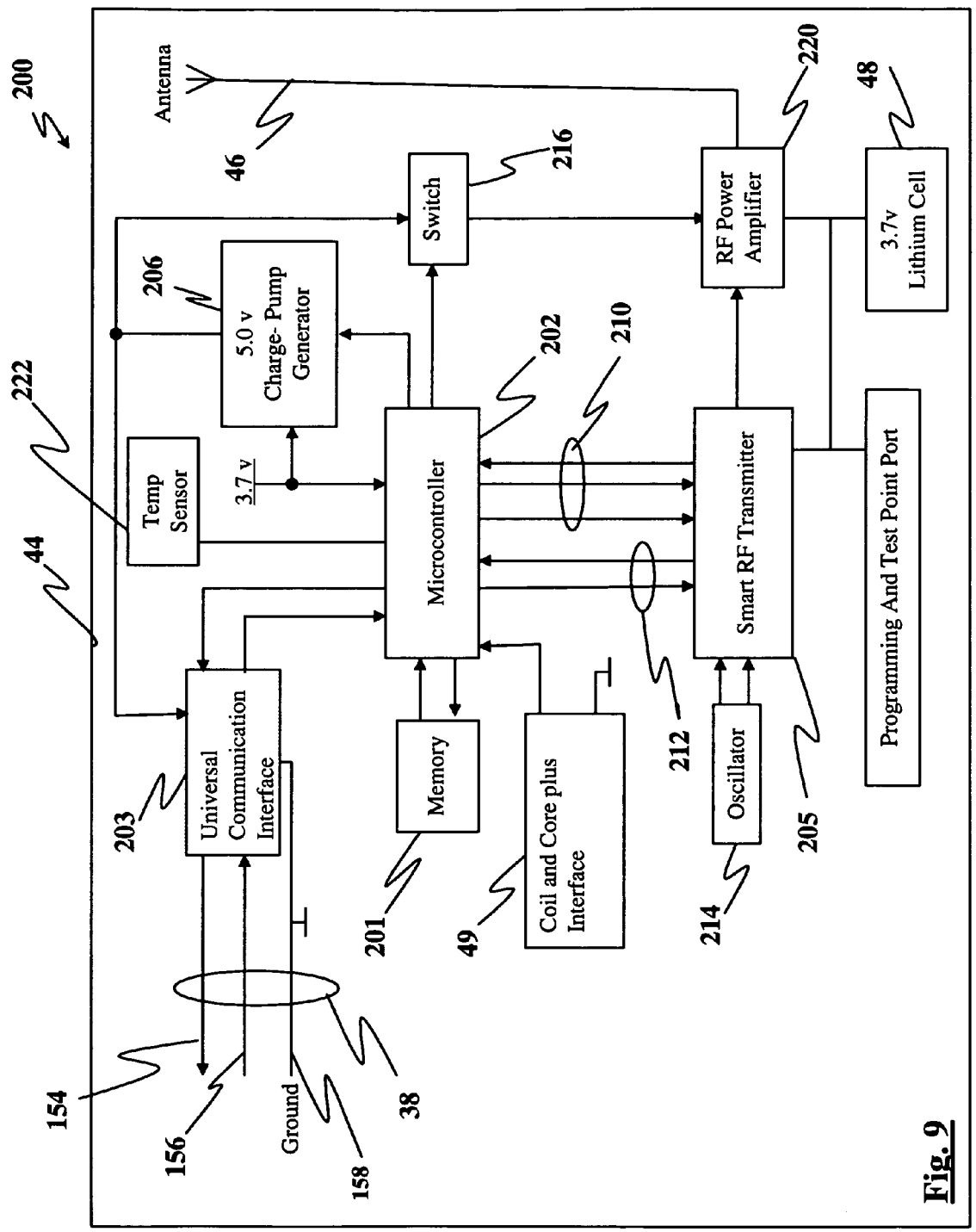
FIG. 9 is a block diagram illustration of one embodiment of a transmitter and associated circuitry.

One embodiment of the transmitter circuitry located on circuit board (44) is now considered. Referring to FIG. 9, transmitter (200) is depicted in a block diagram representation. Transmitter (200) communicates with external devices either by transmitting a data-signal over antenna (46), through universal communication interface (203), or coil/core interface (49). In the preferred embodiment, transmitter (200) is connected to an electronic device associated with meter (10) via universal communication interface (203) and communication link (38). Such electronic device may be register (14) or an electronic device associated with register (14) and any type of communication interface may be used in place of universal communication interface (203) without departing from the scope of the present invention.

For the preferred embodiment, communication link (38) is a three conductor cable comprising two data lines (154, 156) and a ground (158) over which serial communications is conducted. Such data lines may be routed through terminal block (80) to provide a means for connecting additional electronic devices to communication apparatus (40). For example, a laptop computer may be connected through terminal block (80) to facilitate reprogramming of communication apparatus (40).

It will be appreciated that other wiring configurations and communication protocols may be used over wired or wireless communication connections and interfaces without departing from the scope of the present invention. When transmitter/reader communication interface (203) is connected to register (14) or an electronic device associated with register (14), such interface facilitates the transfer of data from electronic device/register to remote meter reading equipment via data signals propagated by antenna (46). When transmitter/reader communication interface (203) is connected to a computing device, such interface facilitates programming or reprogramming of the transmitter.

Transmitter (200) may also be programmed or reprogrammed by connecting a programming device, such as a laptop computer, inductively through coil/core interface (49). Coil/core interface (49) may also be used to perform firmware upgrades. Coil/core interface (49) may also be associated with touchpad technology to facilitate manual reading using an inductive probe.

As noted above, for the preferred embodiment, power is supplied to the transmitter electronics by power source (48). For one embodiment of the present invention, power source (48) is a single 3.7 Volt lithium cell battery. As noted above, in other configurations, power source (48) may be two AA lithium batteries. For system components that require greater than 3.7 volts to operate, charge pump generator (206) is used to generate a voltage larger than the supply voltage from which it operates. For this embodiment of the present invention, charge pump generator (206) generates 5 volts. The output of charge pump generator (206) powers universal communication interface (203) and RF switch (216).

Transmitter (200) further comprises processor (202). One of the functions of processor (202) is to control data transfers between meter (14), memory (201), and remote meter reading equipment. It will be appreciated that memory (201) is optional and all data may be stored in memory located on microcontroller (202). Processor (202) is further connected to coil/core interface (49). Coil/core interface (49) is used to program microcontroller (202) as well as facilitate bios/firmware upgrades. Coil/core interface (49) may also be used by processor (202) to provide touch pad functionality to the system. Such touch pad technology is well known in the art. One example is disclosed in U.S. Pat. No. 5,619,192 issued to Ayala filed Jun. 14, 1994 and such document is incorporated by this reference for all that it discloses.

Still referring to FIG. 9, processor (202) is shown connecting to temperature sensor (222). Temperature sensor (222) may be a discrete component, as shown in FIG. 9, or it may be incorporated within processor (202). Microcontroller (202) uses temperature sensor (222) to monitor the ambient temperature within the transmitter enclosure. Alternatively, a temperature sensor may be used to monitor the temperature of a particular component. Processor (202) may also generate and store temperature-data that is later used to make adjustments to various operating parameters for transmitter (200) as described later. Such temperature-data may also be transmitted to a remote computer.

Processor (202) further connects to RF transmitter (205). RF transmitter (205) may be a single-chip transmitter or a transmitter circuit comprised of discrete components. RF transmitter (205) transmits over a frequency range of 804 MHz to 940 MHz, although other frequency bands may be used without departing from the scope of the present invention. For example, RF transmitter (205) may be used in the well known 402/426/429/433/868/916 MHz ISM/SRD band systems. For the preferred embodiment of the present invention, transmitter (205) is a single-chip design that comprises (i) a communication bus for configuring and controlling the operation of the transmitter, (ii) a programmable output power level, (iii) a programmable output frequency, and (iv) may be powered by a 3.7 volt power source. Such transmitters are well known in the art and are manufactured by MAXIM, ATMEL, INFINEON, Texas Instruments, and Chipcon.

Returning to FIG. 9, antenna (46) is shown connecting to RF power amplifier (220). The types of antennas that may be used include monopole, helical, and loop antennas. Antenna (46) is constructed so that its impedance matches the output impedance of RF power amplifier (220). For the preferred embodiment of the present invention, the output impedance of RF power amplifier (220) is 50Ω.

Processor (202) configures/reconfigures RF transmitter (205) through transmitter communication interface (210). For the preferred embodiment of the present invention, transmitter communication interface (210) is a serial interface. Through transmitter communication interface (210), processor (202) can make configuration adjustments that affect the transmitter output power level, the frequency of the transmitted signal, and the transmitting mode. Processor (202) transfers the data to be transmitted over transmitter data bus (212).

In FIG. 9, oscillator (214) is shown connecting to RF transmitter (205). Oscillator (214) (one exemplary embodiment of a reference-frequency-generator) generates the reference frequency used by RF transmitter (205) to establish the carrier frequency of the transmitted signal. For the preferred embodiment, oscillator (214) is a crystal oscillator that oscillates at a frequency of 14.7456 MHz although other references may be used. RF transmitter (205) generates the carrier frequency of the transmitted signal by multiplying the output of oscillator (214) by a frequency-multiplier-value derived by an equation programmed into transmitter (205). Such frequency-multiplier-value is derived at least in part using a frequency-adjustment-value supplied by processor (202).

Frequency Stability

It is well known that a stable transmitted signal frequency is desired in almost all wireless communication systems. The more stable the transmitted signal frequency, the lower the cost of the electronics making up the receiver required to receive the transmitted signal. As noted above, for the present invention, a crystal oscillator is used to establish the reference frequency used by RF transmitter (205) to generate the carrier frequency of the transmitted signal. It will be appreciated that should the output of oscillator (214) drift, the carrier frequency of the transmitted signal will drift by such drift amount times the frequency-multiplier-value. For example, for a transmitted data-signal carrier frequency of 900 MHz and reference frequency of 14.7456 MHz, the frequency-multiplier-value would be 61.03516. If the reference frequency drifts by only 0.147456 MHz (1%) the carrier frequency will drift by about 9 MHz to 909 MHz.

Unfortunately, the outputs of all crystals drift as the temperature of the crystal changes. The more stable the crystal output frequency in response to changes in temperature, the more expensive the crystal. Fortunately, the drift of some low cost crystals substantially follow a known drift curve or known drift rate.

For one embodiment of the present invention, low cost crystals are used for oscillator (214) where the output of such crystal drifts in response to changes in temperature according to either a known frequency curve or known frequency rate (frequency-drift-data). If the frequency drifts according to a known drift rate, this value is stored in memory (201). If the frequency drifts according to a know drift curve, frequency drift/temperature change data representing such drift curve are stored in table form in memory (201). Both forms of oscillator output drift data are stored in memory (201) and are called frequency-drift-data.

For this embodiment of the present invention, processor (202) uses temperature sensor (222) to access real time (or near real time) temperature data relatable to the temperature of oscillator (214). For example, such temperature-data may be the ambient temperature within transmitter (200) enclosure, the ambient temperature within the pit (9), the temperature of at least part of the frequency-components that generate the reference-frequency. Processor (202) may store such temperature-data in memory (201) as well as transmit such temperature to a remote location.

Processor (202) may also compare such temperature-data to predefined temperature values. Such predefined temperature values may comprise max-temp value, min-temp value, and temp-range values. Such values are preferably predefined by a user and stored in memory (201). It should be apparent that such values would typically be selected by a user to signify possible problems should temperature sensor (222) generate temperature-data that exceeds or drops below a particular temperature value. For example, should processor (202) determine that temperature-data exceeds a predefined max-temp value, processor (202) may set a temperature-warning-flag and/or transmit at least one of the temperature-data and the max-temp value to a remote location.

Processor (202) then accesses the frequency-drift-data, determines a frequency-adjustment-value that substantially compensates for the expected drift in the reference-frequency due to a change in temperature, and sends the frequency-adjustment-value to RF transmitter (205) over transmitter communication bus (210). It should be appreciated that the frequency-adjustment-value may be incorporated into a configuration command that controls the RF transmitter (205) output frequency. Alternatively, the frequency-adjustment-value may be used by RF transmitter (205) in its calculations for determining the carrier frequency of the transmitted signal. For the purposes of this invention, regardless of whether processor (202) or RF transmitter (205) makes the frequency adjustment, a frequency-adjustment-value will be sent from processor (202) to RF transmitter (205) in one form or another (i.e. as part of a configuration command, as a discrete value, etc.).

Transmitted Power Level Stability

Considered next is the effect the status of power source (48) can have on the transmitted signal. As used in this document, the term "power quality" simply refers to any number of metrics typically used to benchmark the quality of the power provided by a power source. Such metrics include voltage level, current supplied, voltage level stability under load, etc., and provide a reference for tracking the status of a power source.

It is well known that the signal strength of a transmitted data-signal can weaken if the quality of power supplied to the transmitter/amplifier degrades beyond a certain point. For example, a transmitter may transmit a (X) dB signal when supplied with a voltage of 4.0 volts but transmit only a (X-.5) dB signal when supplied with a voltage of 3.7 volts.

Notably, the status of power source (48) that powers RF transmitter (205) and RF power amplifier (220) may degrade over time. As a result, the quality of power supplied by power source (48) will degrade over time. As shown in FIG. 9, the output of transmitter (205) is amplified by RF power amplifier (220). Should voltage supplied by power source (48) to RF power amplifier (220) drop (as the status of the power source degrades over time), the power level of the transmitted data-signal will also drop. Thus, the status of power source (48) is another parameter that processor (202) monitors.

Initially, power-level-adjustment-data is either calculated or experimentally measured. For example, the strength of a data-signal transmitted by transmitter (205) may be monitored as the voltage supplied to transmitter 205 and/or RF power amplifier (220) is varied. Any change in transmitted data-signal strength is documented for each supplied voltage level. Such power-level-adjustment-data may be stored in table form in a memory associated processor (202).

Processor (202) is configured to measures the voltage supplied by power source (48). Processor (202) then accesses the power-level-adjustment data stored in memory (201). Using the power-level-adjustment data and the measured voltage level supplied by power source (48), processor (202) reconfigures RF transmitter (205) to transmit at a power level that maintains a substantially constant transmitted data-signal power level. This configuration may be used to provide for a substantially constant transmitted data-signal power level as power source (48) degrades over time. Processor (202) may additionally generate power source status data and may transmit such data to a remote location using RF transmitter (205).

Transmit Modes

Presented next are the modes of operation for transmitter (200). As noted above, transmitter (200) is powered by a power source. Consequently, minimizing power consumption is one goal of the present invention. Thus, to assist in minimizing power consumption, for the preferred embodiment, transmitter (200) does not transmit a data-signal continuously. Instead, transmitter (200) is placed in a sleep-mode during predefined periods. It will be appreciated that transmitter (200) does not include a receiver for receiving a transmitted signal. Consequently, one cannot transmit a wake up signal to transmitter to turn on transmitter (200). To overcome this problem, processor (202) is configured to track the passage of time.

Processor (202) may track the passage of time using any number of well known methods and technologies for tracking time. For the preferred embodiment, processor (202) is operatively connected to a time keeping circuit that generates time-data. Such time keeping circuit may be a device external to processor (202) or internal to processor (202). Alternatively, processor (202) may track the passage of time by executing a time keeping program. For this embodiment of the present invention, processor (202) tracks the day of the week and the time of day (hour, minute, and second). Next, processor (202) accesses transmitter-schedule-data stored in a memory associated with processor (202) for determining when to transmit a data-signal. Examples of transmitter-schedule-data include a transmit start time, stop time, and transmit sequence.

Using such time-data and transmitter-schedule-data, transmitter can be placed in a sleep-mode until processor (202) determines that a transmission session should begin. In addition, using such time-data, processor (202) can configure transmitter to transmit in one of many modes (described below).

For the present embodiment of the invention, RF transmitter (205) is initially placed in a sleep-mode. While in sleep-mode, RF transmitter (205) consumes minimal power (or no power). Processor (202) tracks the passage of time by generating or accessing time-data. Next, processor (202) access transmitter-schedule-data and compares the time-data to the transmitter-schedule-data. Examples of transmitter-schedule-data include a time period (such as 4:30 pm to 5:30 pm). When processor (202) determines that a transmission session should begin, processor (202) places transmitter (205) in a transmit-enable mode. The duration (length in time) of the transmit-enable mode may be a preset constant value or a user programmable value. While in transmit-enable mode, RF transmitter (205) may transmit a data-signal continuously or, to further conserve power, may transmit a data-signal according to a predefined transmit sequence. Restated, transmitter may be configured to transmit a data-signal for a predefined transmit-on time and then stop transmitting for a predefined transmit-off time. Such a sequence would repeat for the duration of the transmit-enable period.

Additionally, there could be set sequences tailored for a particular situation. For example, a walk-by transmit mode could be a transmitter sequence specifically selected for relatively slow moving persons walking through a neighborhood with remote meter reading equipment. For such situations, longer transmit-off times are desirable. Similarly, a drive-by transmit mode could be a transmitter sequence specifically selected for situations where the remote meter reading equipment will be attached to a moving vehicle. Such a transmitter sequence could be based on the speed limit in the surrounding area or a generic on-off sequence.

By way of example, consider the following transmission schedule. Processor (202) is programmed to enable the transmitter for two hours on Mondays, Wednesdays, and Fridays, beginning at 4:00 pm. Processor (202) determines that it is 4:00 pm on a Monday and processor (202) places RF transmitter (205) in transmit-enable mode. Next, processor (202) accesses transmission sequence data stored in memory (201) and determines the transmission sequence to be used. For this example, the transmission sequence is as follows, transmit data-signal for six seconds and stop transmitting data-signal for 6 seconds. Processor (202) sends the corresponding configuration commands to RF transmitter (205) over transmitter communication bus (210). RF transmitter (205) begins transmitting the data-signal for six seconds followed by a six second period without transmitting the data-signal. Processor (202) continues to track the passage of time until processor (202) determines that the current time is 6:00 pm. Next, processor (202) places the RF transmitter (205) back into sleep-mode.

Figure 10:
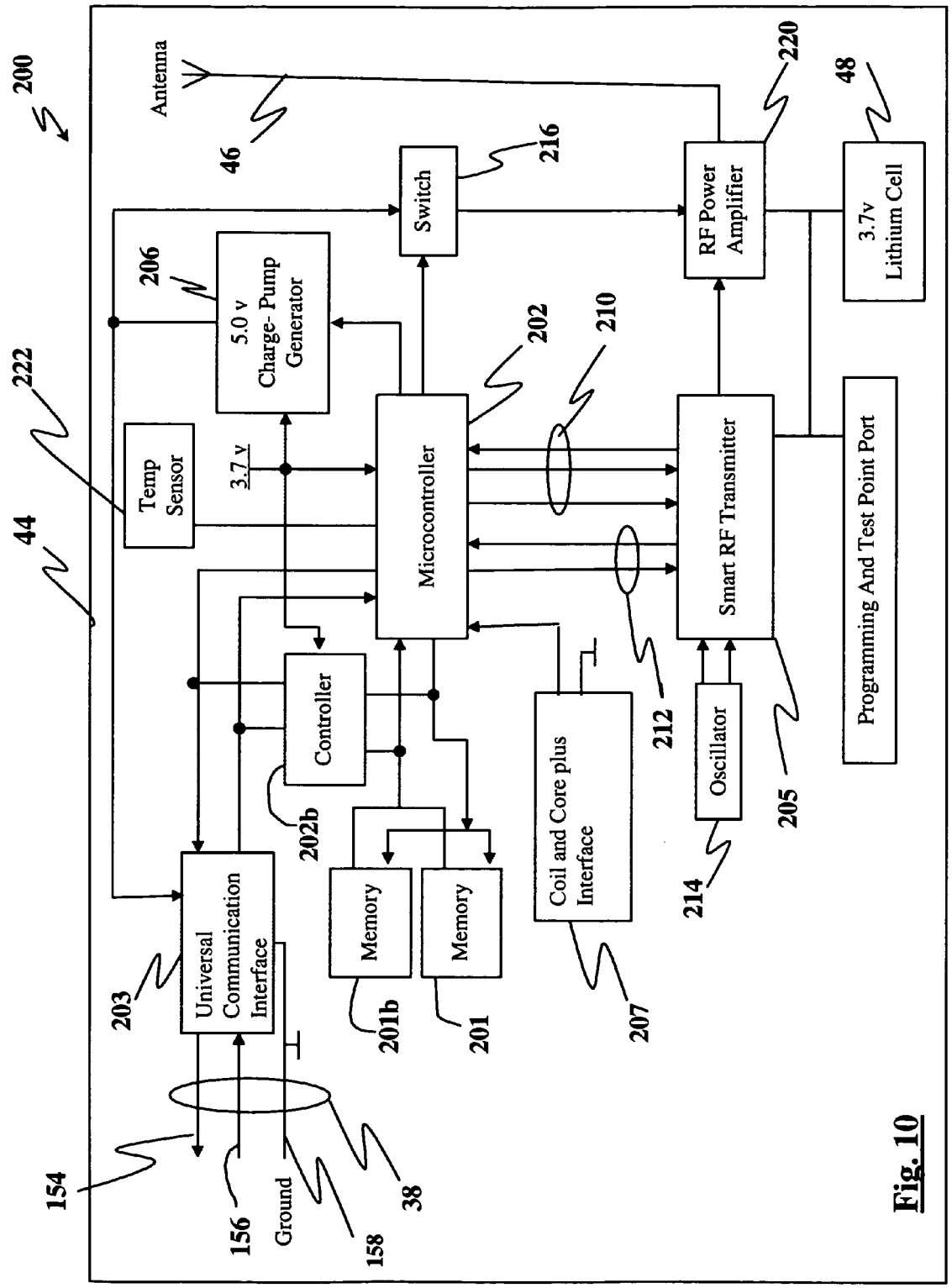
FIG. 10 is a block diagram illustration of one embodiment of a transmitter and associated circuitry including datalogger circuitry.

Referring now to FIG. 10, an exemplary circuit board (44) further comprising data-logger circuitry is depicted. For this configuration of the invention, data-logger controller (202b) receives system-data from meter (10) via communications link (38). The system-data is stored in memory (201b). Such data-logger technology is well known in the art and a detailed explanation is not necessary. It should be noted that memory (201b) may be separate from memory (201) as shown in FIG. 10, or controller (202b) may simply use memory (201) and discrete memory (201b) eliminated. Alternatively, memory (201b) may be integral to controller (202b). Controller (202b) may be any suitable logic device such as a microcontroller, a CPU, or an ASIC for receiving and recording data from meter (10). Additionally, the controller (202b) functions may be performed by microcontroller (202) and discrete controller (202b) eliminated.

Figure 11:
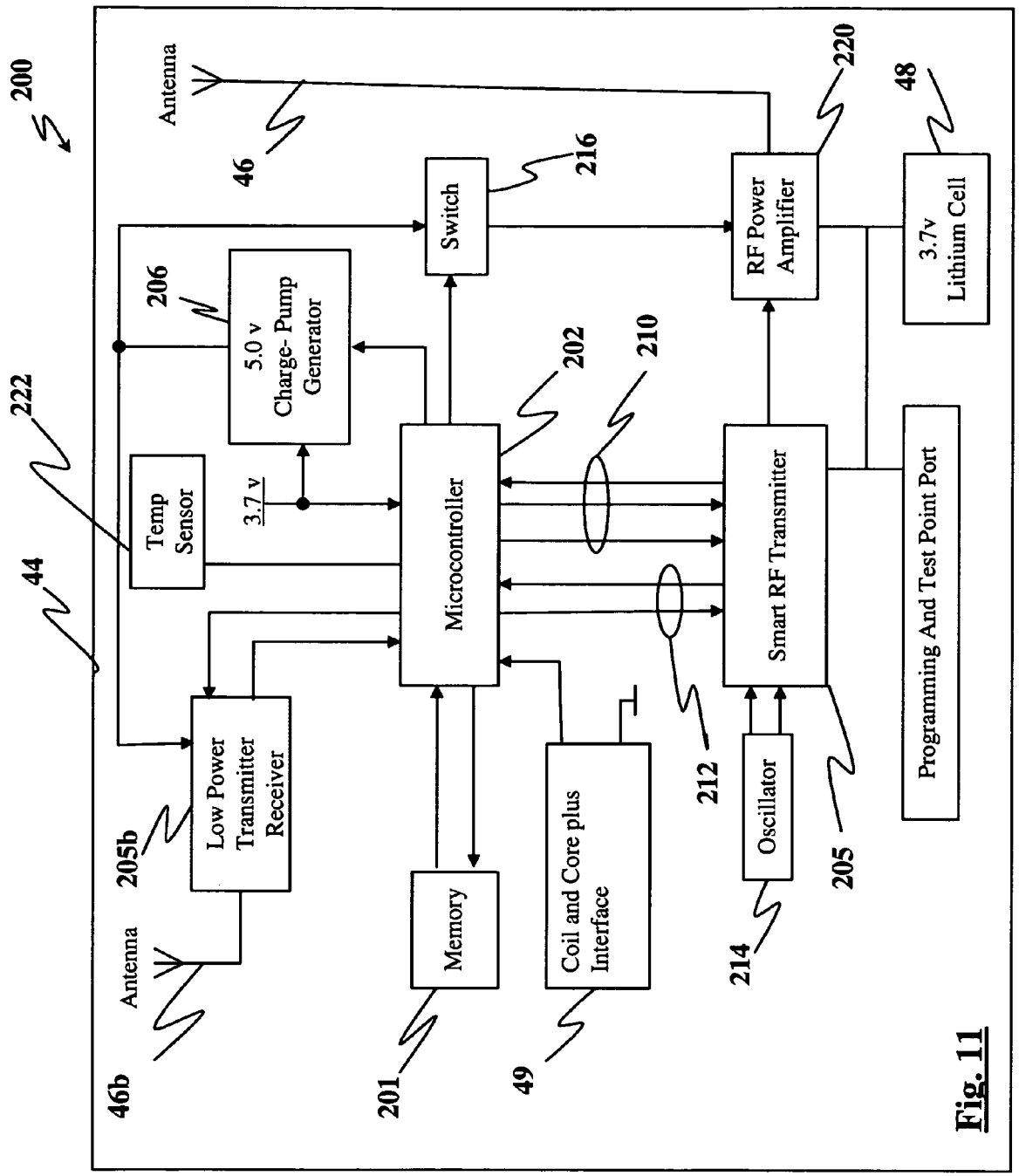
FIG. 11 is a block diagram illustration of one embodiment of a transmitter and associated circuitry including a wireless communication link comprising a receiver and a low powered transmitter.

Referring now to FIG. 11, an exemplary circuit board (44) comprising a transmitter and transmitter-receiver circuitry is depicted. Low power transmitter receiver (205b) replaces wired communication link (82) with a wireless communication link (82). Transmitter receiver (205b) is associated with communication link antenna (46b) and is suitably configured for receiving signals transmitted from a meter-transmitter associated with the meter. Such low power transmitter/receiver technology may be any type of well known technology. Examples of such technology include Bluetooth and Wi-Fi. It will be appreciated that transmitter receiver (205b) may additionally be coupled antenna (46) for receiving signals transmitted from outside pit (9) thereby creating a dual diversity antenna system. Alternatively, for such embodiments, communication link antenna (46b) may be eliminated. Thus, with the dual antenna system, signals from with the pit (9) as well as signals from outside the pit (9) may also be received by communication apparatus (40). Additionally, RF transmitter (205) may be configured to transmit the low powered signals to meter (10). For such configuration, transmitter-receiver (205*b*) may be replaced by a receiver only device.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A communication apparatus for transmitting data from a utility meter to a remote location wherein the utility meter is installed in an underground pit enclosure associated with a pit lid that is generally at ground level, said pit lid having an opening there through, said communication apparatus comprising:
    an enclosure having a top-section and a depending base, wherein said top-section rests generally on top of the pit lid and wherein said depending base extends from said top-section to a point at least partly through the pit lid opening;
    a circuit board comprising a transmitter, said circuit board disposed at least partially inside the top-section and substantially co-planar with said top-section;
    a power source associated with said circuit board and configured for supplying power to said circuit board;
    a transmitter-meter communication link for transferring system-data between the transmitter and the meter;
    an antenna situated at least partially inside the top-section, said antenna associated with said transmitter whereby data-signals generated by said transmitter are propagated by said antenna to a remote location; and
    wherein said data-signals comprise at least part of said system-data.

2. A communication apparatus for transmitting data from a utility meter to a remote location as in claim 1, wherein said power source is located inside the pit enclosure, said power source associated with the circuit board via a power-buss that runs through the pit lid opening, wherein said power-buss has a first access point and a second access point, and wherein said first access point is associated with the power source and said second access point is associated with the circuit board.

3. A communication apparatus for transmitting data from a utility meter to a remote location as in claim 1, wherein said power source is at least one battery disposed within said depending base and wherein said apparatus further comprises an auxiliary power connector.

4. A communication apparatus for transmitting data from a utility meter to a remote location as in claim 3, wherein said battery is supplied with at trickle charge from at least one of (a) a photovoltaic device and (b) a betavoltaic device.

5. A communication apparatus for transmitting data from a utility meter to a remote location as in claim 1, wherein said transmitter-meter communication link is a multiple conductor data-cable comprising a terminal block, said terminal block providing a node for making and breaking the communication link between the circuit board and the meter for at least one conductor.

6. A communication apparatus for transmitting data from a utility meter to a remote location as in claim 5, wherein said multiple conductor data-cable comprises a ground conductor, a first data conductor, and a second data conductor coupled to a depending base connector.

7. A communication apparatus for transmitting data from a utility meter to a remote location as in claim 5, wherein said power source is located inside the enclosure, said power source associated with the circuit board via a power-buss that runs through the pit lid opening.

8. A communication apparatus for transmitting data from a utility meter to a remote location as in claim 7, wherein said power-buss comprises a ground conductor and a power conductor, and wherein said power conductor runs through said terminal block comprising a node configured for at least one of (a) making a connection to the power conductor, (b) breaking a connection to the power conductor, and (c) for making and breaking the power conductor connection between the circuit board and the power source.

9. A communication apparatus for transmitting data from a utility meter to a remote location as in claim 1, further comprising a receiver associated with the circuit board, said receiver suitably configured for receiving signals transmitted from a second transmitter associated with the meter, wherein said receiver and said second transmitter make up at least part of said transmitter-meter communication link.

10. A communication apparatus for transmitting data from a utility meter to a remote location as in claim 1, wherein said circuit board further comprises data-logger circuitry for recording system-data.

11. A communication apparatus for transmitting data from a utility meter to a remote location as in claim 1, wherein said circuit board further comprises touch-pad circuitry suitably configured for at lease one of (a) reading the meter and (b) reprogramming a processor associated with the transmitter.

12. A RF module for transmitting data from an electronic device to a remote location wherein the electronic device is installed in an underground pit enclosure associated with a pit lid that is generally at ground level, said pit lid having an opening there through, said RF module comprising:
    a housing having a top-section and a depending base, wherein said top-section rests generally on top of the pit lid and wherein said depending base extends from said top-section to a point at least partly though the pit lid opening;
    a RF transmitter disposed one of (a) at least partially inside the top-section and co-planar to said top-section, and (b) at least partially inside the top-section with none of the RF transmitter disposed in the depending base;
    a power source associated with the RF transmitter for supplying power to the RF transmitter;
    a communication link for transferring system-data between the RF transmitter and an electronic device disposed within an underground pit enclosure;
    an antenna situated at least partially inside the top-section, said antenna associated with said RF transmitter whereby data-signals generated by said transmitter are propagated by said antenna to a remote location; and
    wherein said data-signal comprises at least part of said system-data.

13. A RF module for transmitting data from an electronic device to a remote location as in claim 12, wherein said power source is disposed within said pit enclosure, said power source associated with the RF transmitter via a power-buss that runs through the pit lid opening, wherein said power-buss has a first access point and a second access point, and wherein said first access point is associated with the power source and said second access point is associated with the RF transmitter.

14. A RF module for transmitting data from an electronic device to a remote location as in claim 12, wherein said power source is at least one battery.

15. A RF module for transmitting data from an electronic device to a remote location as in claim 14, wherein said at least one battery comprises a nuclear battery.

16. A RF module for transmitting data from an electronic device to a remote location as in claim 14, wherein said battery is supplied with a trickle charge from at least one of (a) a photovoltaic device and (b) a betavoltaic device.

17. A RF module for transmitting data from an electronic device to a remote location as in claim 12, wherein a second transmitter is associated with the electronic device, and wherein a receiver is associated with said RF transmitter, and wherein said communication link is a wireless communication link between the second transmitter and the receiver.

18. A transmitter module for transmitting data from an electronic device to a remote location wherein the electronic device is installed in an underground pit enclosure, said pit enclosure configured to receive a detachable pit lid that is generally at ground level, said transmitter module comprising:
   a module pit lid suitably sized for being associated with the pit enclosure;
   a battery operated RF transmitter disposed within said module pit lid wherein said RF transmitter is associated with an electronic device through a communication link, said communication link suitably configured for transferring system-data between said RF transmitter and said electronic device;
   an antenna associated with said RF transmitter whereby data-signals generated by said RF transmitter are propagated by said antenna to a remote location; and
   wherein said data-signal comprises at least part of said system-data.

19. A method of associating a transmitter module with a lid that at least partially covers an underground enclosure, said lid having an opening there through, comprising the steps of:
   providing a housing having a top-section and a depending base, wherein said top-section rests generally on top of said lid with said depending base extending at least partially through said opening;
   disposing a transmitter associated with an antenna at least partially within said top-section and substantially co-planar with said top-section, said antenna configured to propagate data-signals generated by said transmitter to a remote location;
   providing a communication link between an electronic device within said pit and said transmitter; and
   associating at least one battery with said transmitter, said battery configured for providing power to said transmitter.

20. A method of associating a transmitter module with a lid as in claim 19, wherein said housing is integral to said lid.

21. A method of associating a transmitter module with a lid as in claim 19, wherein said battery is disposed within said depending base.

22. A method of associating a transmitter module with a lid as in claim 19, wherein said battery is disposed underneath said lid and wherein said battery is operatively connected to said transmitter via a wired connection that runs through said depending base.

23. A method of associating a transmitter module with a lid as in claim 19, further comprising the steps of associating a receiver with said transmitter and wherein said communication link is a wireless link.

24. A RF module for transmitting data from an electronic device to a remote location wherein the electronic device is installed in an enclosure and wherein one side of said enclosure has an opening there through, said RF module comprising:
   a housing having a first chamber and a second chamber, wherein said first chamber rests generally adjacent to said opening and wherein said second chamber extends from said first chamber to a point at least partly through the opening;
   a RF transmitter disposed at least partially inside the first chamber and substantially co-planar with said first chamber;
   a power source associated with the RF transmitter suitably configured for supplying power to the RF transmitter;
   a communication link for transferring system-data between the RF transmitter and the electronic device disposed within the enclosure;
   an antenna situated at least partially inside the first chamber, said antenna associated with said RF transmitter whereby data-signals generated by said transmitter are propagated by said antenna to a remote location; and
   wherein said data-signals comprise at least part of said system-data.

25. A RF module for transmitting data from an electronic device to a remote location as in claim 24, wherein said power source is located inside the enclosure, said power source associated with the RF transmitter via a power-buss that runs through the opening, wherein said power-buss has a first access point and a second access point, and wherein said first access point is associated with the power source and said second access point is associated with the transmitter.

26. A RF module for transmitting data from an electronic device to a remote location as in claim 24, wherein said power source is at least one battery located inside said second chamber.

27. A RF module for transmitting data from an electronic device to a remote location as in claim 26, wherein said battery is supplied with a trickle charge from at least one of (a) a photovoltaic device and (b) a betavoltaic device.

28. A RF module for transmitting data from an electronic device to a remote location as in claim 24, further comprising a receiver associated with said RF transmitter, and wherein said communication link is a wireless communication link.

* * * * *